United States Patent [19]

Shinagawa et al.

[11] 3,947,372

[45] Mar. 30, 1976

[54] FERRIMAGNETIC MATERIAL

[75] Inventors: Kiminari Shinagawa; Sadao Hishiyama, both of Hachioji; Hiroshi Takeuchi, Kokubunji; Satoshi Taniguchi, Tokorozawa, all of Japan

[73] Assignee: Hitachi, Ltd., Japan

[22] Filed: July 25, 1973

[21] Appl. No.: 382,293

[30] Foreign Application Priority Data

Aug. 11, 1972  Japan.............................. 47-79928

[52] U.S. Cl. ............. 252/62.57; 423/263; 423/594; 252/62.59
[51] Int. Cl.² .................... C04B 35/26; C04B 35/50
[58] Field of Search........... 252/62.57, 62.56, 62.59, 252/62.62, 594; 106/73.2; 423/263

[56] References Cited
UNITED STATES PATENTS 3,763,045   10/1973   Takamizawa .................... 252/62.57

OTHER PUBLICATIONS

S. Geller et al., "Applied Physics Letters" Vol. 3, No. 2 (1963) pp. 21–22.
Shinagawa et al. "Chem Abstracts" p. 153071j, 1973.

Primary Examiner—Jack Cooper
Attorney, Agent, or Firm—Craig & Antonelli

[57] ABSTRACT

The temperature for preparation of garnet phase of the conventional yttrium or rare-earth iron garnet can be lowered by about several hundreds centigrade by substituting 24C site of the garnet by lead. Thus obtained lead-substituted yttrium or rare-earth iron garnet has greater specific Faraday rotation than lead-nonsubstituted yttrium or rare-earth iron garnet.

8 Claims, 5 Drawing Figures

FERRIMAGNETIC MATERIAL

BACKGROUND OF THE INVENTION

The present invention relates to a novel ferrimagnetic material. More particularly, it relates to a lead-substituted rare-earth iron garnet having the compositions of a rare-earth iron garnet where rare-earth element is substituted by lead. The term "rare-earth iron garnet" used herein means a synthetic iron garnet of yttrium and rare-earth elements.

Discovery of synthetic iron garnet, especially yttrium iron garnet brings about new interest in the field of ferrimagnetic materials and it is extensively used as an isolator in microwave transmission system. Recently, the iron garnet is widely used as an optical modulator, a magnetic flux sensor, a magneto-optical memory and a bubble domain device, utilizing its Faraday effect.

In case of the conventional synthetic iron garnet, e.g., simple rare-earth iron garnet, preparation temperature of single garnet phase is about 1400°C which is considerably high and figure of merit representing its specific Faraday rotation is lower by about 0.2. Furthermore, as disclosed in Japanese Pat. No. 5344/68, preparation temperature of single garnet phase of $(RBi)Fe_5O_{12}$ which has the compositions of a rare-earth iron garnet in which a part of rare-earth element is replaced by Bi is about 1,000°C. This $(R_{3-x}Bi_x)Fe_5O_{12}$ has a lower preparation temperature of single garnet phase than the simple rare-earth garnet, but the former preparation temperature is still high.

SUMMARY OF THE INVENTION

Therefore, the object of the present invention is to provide a synthetic iron garnet having a low preparation temperature of a garnet phase.

According to the present invention, temperature for preparation of a garnet phase is markedly decreased and specific Faraday rotation of synthetic iron garnet obtained is remarkably increased by substituting 24C-site of a synethic iron garnet with lead. For example, according to the present invention, the temperature required for preparation of yttrium iron garnet can be lowered by about 500°C in maximum and specific Faraday rotation of lead-substituted yttrium iron garnet is several times that of simple yttrium iron garnet. The same results can be obtained when rare-earth element of rare-earth iron garnet having rare-earth element other than yttrium is substituted by lead.

As mentioned above, temperature for preparation of a stable garnet phase can be markedly lowered only when rare-earth element in rare-earth iron garnet is substituted by lead and the temperature cannot be markedly lowered when the rare-earth element is substituted by other any elements.

It has been reported in "Applied Physics Letters" Vol. 3 (1963) pages 21-22 that bismuth can also cause reduction in the temperature for preparation of a garnet phase. However, degree of reduction in temperature for preparation of a garnet phase due to lead substitution is greater than that due to bismuth-substitution. Furthermore, specific Faraday rotation of lead-substituted synthetic iron garnet is smaller than that of synthetic iron garnet in which a part of yttrium or rare-earth element is substituted by bismuth, but is greater than that of any other substituted synthetic iron garnets.

As mentioned above, as compared with the conventional substituted yttrium or rare-earth iron garnets, in case of the lead-substituted yttrium or rare-earth iron garnet of the present invention, a stable garnet phase is prepared at an extremely lower temperature and it has a great specific Faraday rotation.

Figure 1:
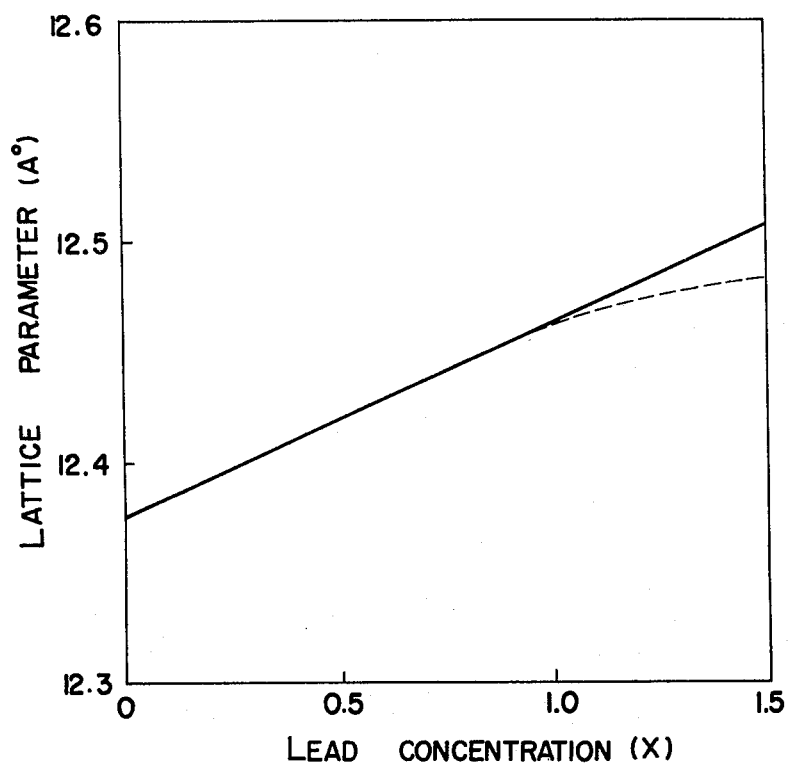
FIG. 1 is a graph which shows values of lattice parameter of $Y_{3-x}Pb_xFe_{5-x}Ge_xO_{12}$ of the present invention in relation to the value $x$.

In said general formula, $x = 0.2, 0.5, 0.75$ or $1.0$.

DESCRIPTION OF THE PREFERRED EMBODIMENT

Examples of the present invention will be explained below.

A polycrystalline sample of yttrium or rare-earth iron garnet having the following general formula:

$$R_{3-x}Pb_xFe_{5-x}M_xO_{12}$$

[wherein R is at least one member selected from yttrium and rare-earth elements, M is a tetravalent element to be substituted for Fe and 0.05 $x$ 1.5 (said M may also be pentavalent element and in this case, said general formula should be $R_{3-x}Pb_x$-$Fe_{5-y}M_yO_{12}$ in which 0.05 $y$ 1.5 and other definitions are the same as previously given)] was prepared by the ceramic technique. When lead content exceeds 1.0, a second phase appears, but garnet phase is predominant before the lead content exceeds 1.5 and no trouble is brought about for practical purpose. However, when the content exceeds 1.5, single garnet phase is not prepared and when the content is less than 0.05, temperature for preparation of garnet phase is nearly the same as in case of simple rare-earth iron garnet and reduction in temperature for preparation of garnet phase is not attained by lead-substitution. In accordance with the present invention, firstly, oxides of at least one of yttrium and rare-earth elements, PbO, $\alpha Fe_2O_3$ and $MO_2$ were weighed depending upon the desired value $x$. They were well mixed and ground and then the mixture was prefired. This was ground, then a binder was incorporated therein, the mixture was subjected to pressing and thereafter sintered. Said prefiring and sintering were carried out in an oxidizing atmosphere. Thus sintered sample was confirmed to have desired garnet phase by X-rays. Measurement of specific Faraday rotation was made on a thin plate produced by cutting said sintered sample and polishing it at room temperature.

Conditions in the sintering process will be detailedly explained with reference to an Example in which Ge was used as M.

EXAMPLE 1

The following oxides were weighed in the following weights.

| | |
|---|---|
| PbO | 6.928 g |
| $Y_2O_3$ | 17.521 g |
| $Fe_2O_3$ | 22.305 g |
| $GeO_2$ | 3.247 g |

These amounts corresponded to the molar ratio of the composition $Y_{2.5}Pb_{0.5}Fe_{4.5}Ge_{0.5}O_{12}$. A mixture of said oxides was fired under the following conditions.

| Prefiring | 800°C | 1.5 hour |
|---|---|---|
| Sintering | 1000°C | 3 hours |

EXAMPLE 2

The following oxides in the amounts as indicated were weighed.

| | |
|---|---|
| PbO | 12.784 g |
| $Y_2O_3$ | 12.933 g |
| $Fe_2O_3$ | 18.293 g |
| $GeO_2$ | 5.991 g |

These corresponded to the molar ratio of the composition $Y_2Pb_1Fe_4Ge_1O_{12}$. A mixture of these oxides was fired under the following conditions.

| Prefiring | 800°C | 1.5 hour |
|---|---|---|
| Sintering | 950°C | 5 hours |

Samples obtained in the above Examples had single garnet structure. The mixture already became nearly garnet phase by the prefiring at 800°C and the sintering temperature was determined so that samples having high density and only a few vacant pores were produced in order to make the measurement of specific Faraday rotation easy. The maximum sintering temperature 950°C is extremely lower than 1400°C which is required for preparing a single phase yttrium iron garnet and is also lower than the sintering temperature of the reported bismuth-substituted yttrium iron garnet. Actually, substantially no garnet phase is prepared by prefiring at 900°C in case of the bismuth-substituted yttrium iron garnet. Moreover, sintering temperature of yttrium iron garnet containing bismuth in the same amount as lead per one molecule of iron garnet is 1000°C.

FIG. 1 shows change of lattice parameter of lead-containing iron garnet represented by the general formula: $Y_{3-x}Pb_xFe_{5-x}Ge_xO_{12}$. In this FIG. 1, ordinate represents values of lattice parameter and abscissa represents compositions shown by amount $(x)$ of lead per one molecule.

Figure 2:
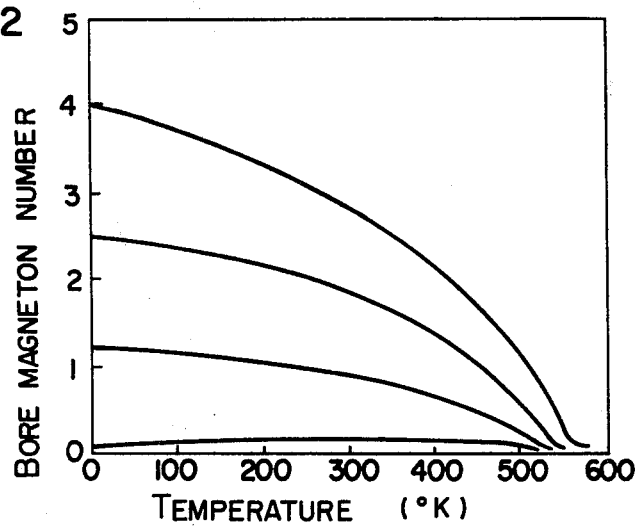
FIG. 2 is a graph which shows spontaneous magnetic moment of $Y_{3-x}Pb_xFe_{5-x}Ge_xO_{12}$ in terms of Bohr magneton number per one molecule.

FIG. 2 shows values of spontaneous magnetic moment of the lead-containing iron garnet in terms of Bohr magneton number per one molecular formula. The ordinate represents Bohr magneton number and abscissa represents absolute temperature (°K). Curves 1, 2, 3 and 4 show values of spontaneous magnetic moment of lead-containing iron garnet represented by the general formula: $Y_{3-x}Pb_xFe_{5-x}Ge_xO_{12}$ wherein $x$ is 0.2, 0.5, 0.75 and 1.0, respectively.

Figure 3:
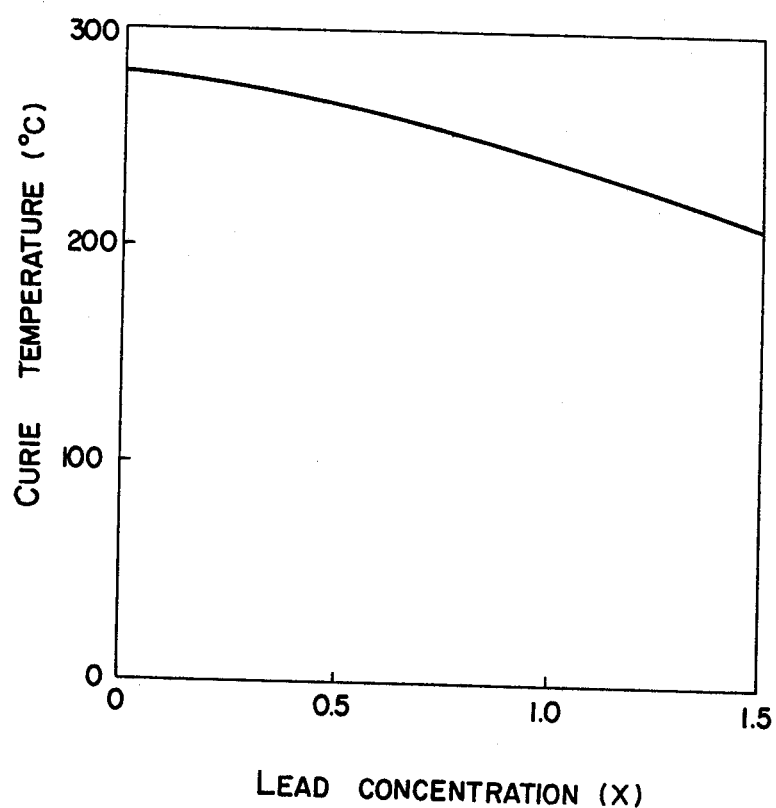
FIG. 3 is a graph which shows Curie temperatures of $Y_{3-x}Pb_xFe_{5-x}Ge_xO_{12}$ in relation to the value $x$.

FIG. 3 shows change of Curie temperature of lead-containing iron garnet depending upon amount of lead. The ordinate shows Curie temperature in °C and abscissa shows value $x$ of $Y_{3-x}Pb_xFe_{5-y}Ge_yO_{12}$. Since Fe is substituted with non-magnetic ion, value of spontaneous magnetic moment is reduced as in FIG. 2, but rate of decrease in Curie temperature is small in FIG. 3. For example, as mentioned in "Bell System Technical Journal" Vol. 43 (published in 1964) pages 565–623, as compared with Curie temperature (at $x = 1.0$) of $Y_{3-x}Ca_xFe_{5-x}Ge_xO_{12}$ (i.e., Ca is substituted for Pb), that of lead-substituted garnet is higher by about 50°C.

Figure 4:
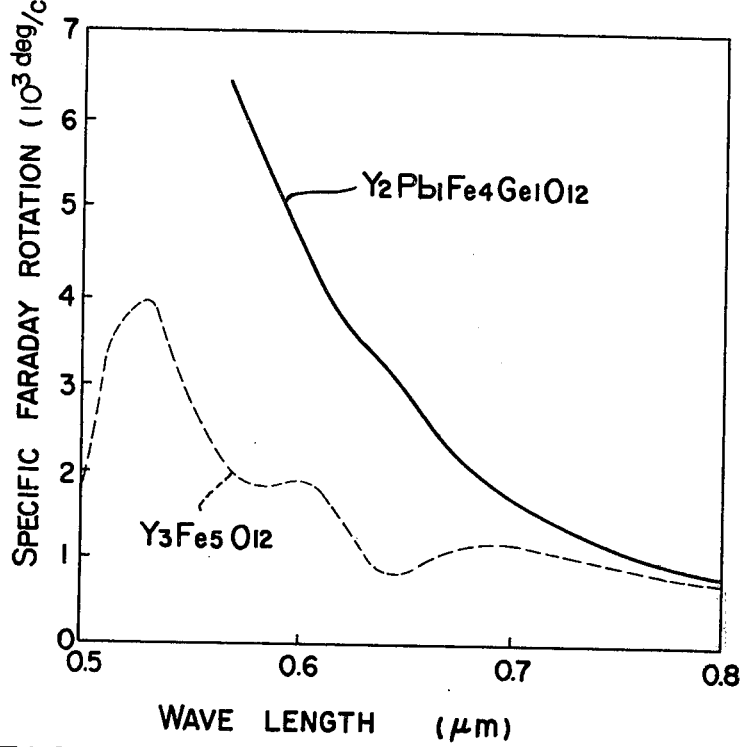
FIG. 4 is a graph which shows specific Faraday rotations of $Y_2Pb_1Fe_4Ge_1O_{12}$ of the present invention in comparison with those of $Y_3Fe_5O_{12}$.

FIG. 4 shows comparison of specific Faraday rotation of $Y_2Pb_1Fe_4Ge_1O_{12}$ with that of $Y_3Fe_5O_{12}$. The ordinate shows specific Faraday rotation (in unit of angle) per 1 cm and the abscissa shows wave length of light to be measured (in $\mu$ unit). In this FIG. 4, sign of the specific Faraday rotation of $Y_3Fe_5O_{12}$ is, in fact, opposite to that of $Y_2Pb_1Fe_4Ge_1O_{12}$, but only absolute values are shown for convenience of comparison (in dotted line). As is clear from this Figure, the specific Faraday rotation of rare-earth iron garnet nearly corresponds to that of yttrium iron garnet and therefore the sign of specific Faraday rotation of iron garnet is changed by substitution of yttrium by lead and the value is increased.

Figure 5:
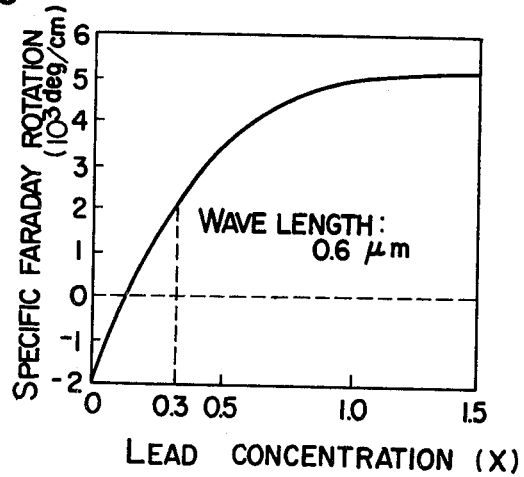
FIG. 5 is a graph which shows specific Faraday rotations of $Y_{3-x}Pb_xFe_{5-x}Ge_xO_{12}$ in relation to the value $x$.

FIG. 5 shows change of specific Faraday rotation of lead-containing iron garnet at wave length of $0.6\mu$ depending upon amount of lead substituted. The ordinate represents value of specific Faraday rotation in $10^3$ $^{deg}$/cm unit and the abscissa represents value $x$ in $Y_{3-x}Pb_xFe_{5-x}Ge_xO_{12}$. As is clear from FIG. 5, when value $x$ is more than 0.3, specific Faraday rotation (specific Faraday rotation coefficient 0.2) of lead-containing iron garnet is larger than that of simple rare-earth iron garnet (or yttrium iron garnet). However, when x is more than 1.5, effect of second phase becomes great. Therefore, from the point of specific Faraday rotation, range of $x$ is 0.3 $x$ 1.5. Although the values of specific Faraday rotation shown in FIGS. 4 and 5 are those measured on polycrystalline fired sample, it has been confirmed on various iron garnets that even when the iron garnet is polycrystalline sample, the specific Faraday rotation of the sample which has a high density is about 95% or higher of that of single crystalline iron garnet.

The above mentioned various characteristics are due to the presence of lead and iron in lead-substituted iron garnet. Therefore, the present invention includes garnets containing all elements capable of being substituted for yttrium, e.g., rare-earth elements and their mixtures. Moreover, elements capable of being substituted for iron are also known and these include tetra- or pentavalent elements such as niobium, tantalum, ruthenium, antimony, titanium, zirconium, hafnium, silicon, tin, germanium, vanadium, etc. and mixtures thereof.

As explained above, lead-substitution of iron garnet at 24C site has two effects, namely it can cause reduction of temperature for preparation of the iron garnet and remarkable increase of specific Faraday rotation.

What is claimed is:

1. A polycrystalline ferrimagnetic material having a garnet structure and comprising a yttrium or rare-earth iron garnet represented by the general formula:

$$R_{3-x}Pb_xFe_{5-y}M_yO_{12}$$

wherein R is an element selected from the group consisting of yttrium and rare-earth elements, M is at least one metal selected from the group consisting of niobium, tantalum, ruthenium, germanium, vanadium, antimony, titanium, zinconium, hafnium, silicon and tin, and the ranges of $x$ and $y$ are $0.05 \leq x \leq 1.5$ and $0.05 \leq y \leq 1.5$, respectively.

2. A polycrystalline ferrimagnetic material according to claim 1, wherein the range of $x$ is $0.3 \leq x \leq 1.5$.

3. A polycrystalline ferrimagnetic material according to claim 2, wherein R is yttrium.

4. A polycrystalline ferrimagnetic material according to claim 3, wherein M is germanium.

5. A polycrystalline ferrimagnetic material according to claim 4, wherein $x = y$.

6. A polycrystalline ferrimagnetic material according to claim 1, wherein R is yttrium.

7. A polycrystalline ferrimagnetic material according to claim 6, wherein M is germanium.

8. A polycrystalline ferrimagnetic material according to claim 7, wherein $x = y$.

* * * * *